(12) United States Patent
Petrucelli

(10) Patent No.: US 6,901,792 B2
(45) Date of Patent: Jun. 7, 2005

(54) RECALL MECHANISM FOR A PRESSURE GAUGE

(75) Inventor: Steven Petrucelli, Cranbury, NJ (US)

(73) Assignee: Measurement Specialties, Inc., Fairfield, NJ (US)

(*) Notice: Subject to any disclaimer, the term of this patent is extended or adjusted under 35 U.S.C. 154(b) by 0 days.

(21) Appl. No.: 10/688,182

(22) Filed: Oct. 17, 2003

(65) Prior Publication Data

US 2004/0154403 A1 Aug. 12, 2004

Related U.S. Application Data

(60) Provisional application No. 60/419,261, filed on Oct. 17, 2002.

(51) Int. Cl.[7] .............................................. G01M 17/02
(52) U.S. Cl. ........................ 73/146; 73/146.5; 340/446
(58) Field of Search ................................. 73/146–146.8; 340/440–448

(56) References Cited

U.S. PATENT DOCUMENTS

| | | | | | |
|---|---|---|---|---|---|
| 4,748,845 | A | * | 6/1988 | Rocco et al. | 73/146.8 |
| 5,394,343 | A | * | 2/1995 | Tsao | 702/140 |
| 5,569,849 | A | * | 10/1996 | Cummings | 73/146.8 |
| 5,774,048 | A | * | 6/1998 | Achterholt | 340/447 |
| 6,385,554 | B1 | * | 5/2002 | Wu | 702/140 |
| 6,571,617 | B2 | * | 6/2003 | Van Niekerk et al. | 73/146 |

* cited by examiner

Primary Examiner—Eric S. McCall
Assistant Examiner—Jermaine Jenkins
(74) Attorney, Agent, or Firm—Plevy, Howard & Darcy PC

(57) ABSTRACT

A recall mechanism for a pressure gauge stores pressure reading outputs for effectively conveying "last value" information to a user when requested.

17 Claims, 2 Drawing Sheets

RECALL MECHANISM FOR A PRESSURE GAUGE

CLAIM FOR PRIORITY

This application claims the benefit under 35 USC 119 of provisional patent application Ser. No. 60/419,261 entitled "Recall Mechanism For Pressure Gauge" filed on Oct. 17, 2002.

FIELD OF THE INVENTION

The present invention relates to a recall mechanism and more specifically, to a recall mechanism for a pressure gauge which stores pressure reading outputs for effectively conveying such "last value" information to a user when needed.

BACKGROUND

Pressure gauges are, of course, well known in the art and are conventionally used for measuring the pressure of a gas or a liquid, such as atmospheric or underwater pressure. Tire pressure gauges, as an example, measure the inflation pressures of vehicle tires in order to maintain their maximum performance and avoid unnecessary wear. The simpler versions of such tire pressure gauges typically use calibrated rods or sliding scales for conveying the reading outputs to the user. Such devices, however, are frequently difficult to read properly and often produce inaccurate readings. The more sophisticated devices, such as digital tire pressure gauges, typically allow more accurate measurements and incorporate features such as backlit liquid-crystal displays (LCDs) for both day or night readings.

Usually, it is useful to achieve highly accurate pressure readings, while also having such information communicated to the user in a manner convenient to the user. The aforementioned digital pressure gauges may provide such accuracy. However, such devices may still be difficult to position on the object to be measured. Additionally, many situations require more convenient methods of reading pressures, such as when the object to be measured is located in a hard to view or hard to reach area.

Thus, pressure gauges which provide greater ease in taking readings and which facilitate communication of such readings to the user are highly desired.

SUMMARY

An aspect of the invention comprises a recall mechanism, which stores a pressure reading and conveys that information to a user in a convenient and easy to comprehend manner. The stored reading output, or "last value", may be communicated both at the time of taking the reading and at a later time as needed. Such convenient communication means may involve both an easy to read visual display and/or an audio means using digitized speech.

The device according to another aspect also provides a durable, easy to grip and ergonomic design, thereby enabling easy positioning and highly accurate readings. By allowing the recall of reading outputs on demand and their effective conveyance to the user, the device improves on the efficiency and ease of taking pressure readings in a wide variety of situations.

A pressure gauge comprises a housing having an inlet port for receiving fluid pressure of an object to be measured, and a sensor in communication with the inlet port for providing a value of the fluid pressure present at the inlet port. A memory stores the measured value. An actuator capable when actuated in a first mode provides an audible output indicative of the stored pressure value.

DETAILED DESCRIPTION

Figure 1:
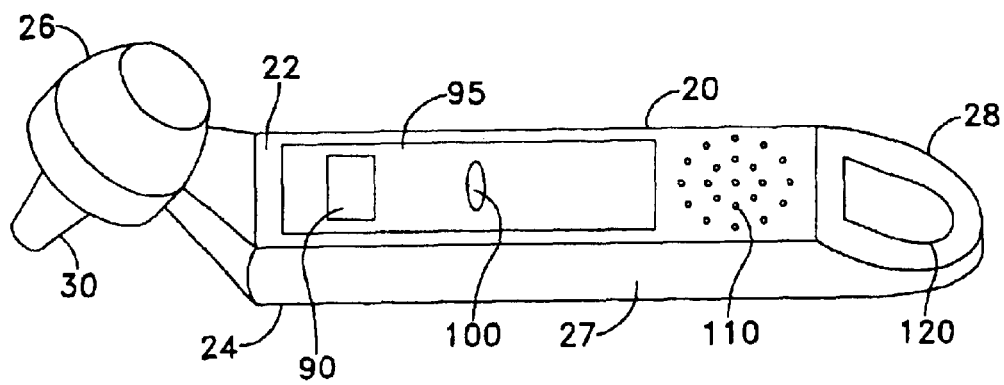
FIG. 1 illustrates a side perspective view of a pressure gauge device embodying the principles of the present invention.

FIG. 1 shows a pressure gauge device 10 according to an exemplary embodiment of the present invention, incorporating a recall mechanism. The device comprises a housing 20 constructed of a durable material such as acrylonitrile butadiene styrene (ABS). In the exemplary embodiment, the housing comprises a top portion 22 and bottom portion 24 coupled to one another at peripheral edges and defining a proximal head end 26, distal end 28, and body 27. The top and bottom portions may be coupled by conventional means including, for example, by means of screws, rivets, snap-fitting, adhesive, welding, and the like. Of course, the housing may also be monolithic. In the exemplary embodiment shown in FIG. 1, the pressure gauge device comprises a handheld tire pressure gauge for measuring air pressure contained in a tire. However, the invention is applicable to various other pressure gauges, particularly other hand-held pressure gauges, which measure fluid pressure associated with an object.

As shown in FIG. 1, a port 30 is disposed at proximal head end 26 for applying the gauge device to a measuring point, such as the valve stem of a tire. The port 30 contains a mechanism such as a rubber seal and pin arrangement (not shown), which communicates with a pressure sensor arrangement located within the housing. The invention also anticipates the incorporation of other conventionally known pressure sensor arrangements for obtaining a signal indicative of the pressure measured.

The device 10 further includes a display area formed on the top portion 22 of the body 27 for providing a visual display of the sensed pressure reading. A speaker region 110 formed on body 27 enables audible signals (e.g. voice) indicative of the sensed pressure reading to be emitted from the interior of the device (via a microprocessor speaker unit). A recall mechanism responsive to a stimulus, such as, for example, depression of an activation area 100 on the outer surface of the housing causes a processor in electrical communication with the activation area to retrieve from memory a stored value of a pressure reading as for example, the last sensed pressure, and provide the value to the user. The value may be provided in the form of a visual display and/or an audible display of the recalled pressure reading. The processor may comprise a microprocessor/controller and include a voice processor or voice chip responsive to the microprocessor for providing an audible output indicative of the pressure measured by the sensor and stored in memory. In another exemplary embodiment, the processor may include a mapping table or lookup table containing a mapping of pressure values to parameters indicative of audible utterances corresponding to the pressure values. Based on the measured sensor output, the device may be programmed to or may include circuitry configured to map the measured/stored value to the nearest lookup table value to obtain the corresponding parameter indicative of an audible utterance of the value nearest to the measured/stored value.

Figure 2:
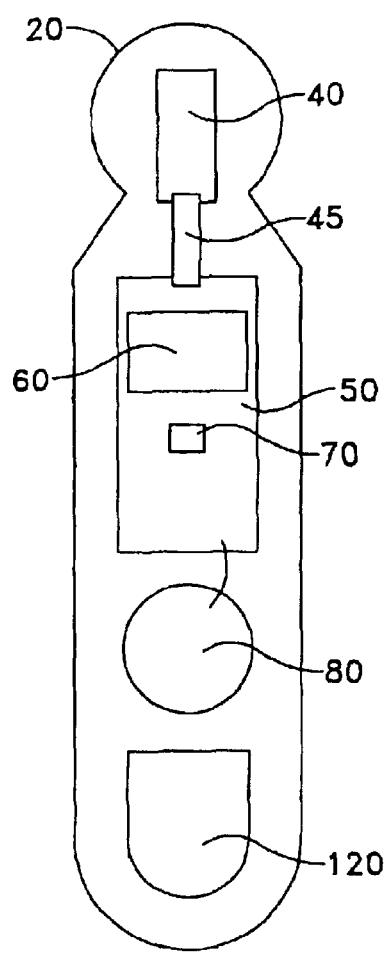
FIG. 2 illustrates a front elevational view of the electronic components contained within the interior housing of the device shown in FIG. 1.
Figure 3:
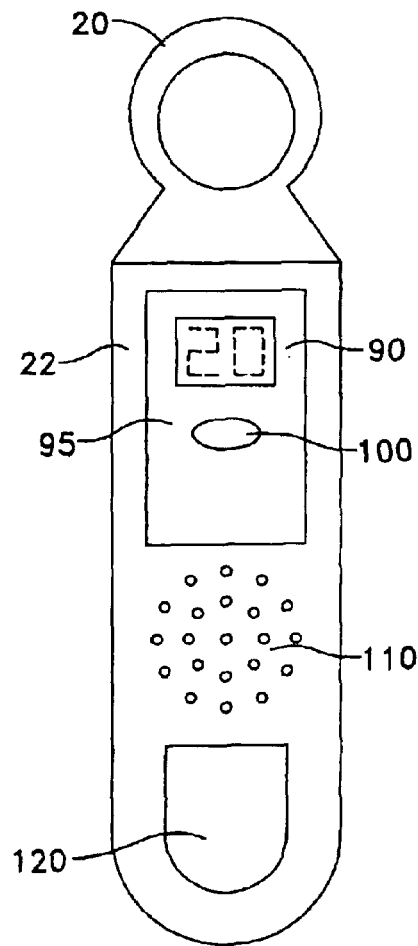
FIG. 3 illustrates an elevational view of the front surface of the exterior housing of the device shown in FIG. 1.

Referring to FIGS. 2 and 3, the interior of housing 20 contains in a top portion thereof a printed circuit board (PCB) 40 having thereon components and wiring associated with the above-described pressure sensor. PCB 40 interconnects with a main PCB 50 by means of wiring 45 such as a flexible connector. The main PCB 50 is positioned within a central region of the housing 20 and is populated with the electrical components and connections required for the processing and control steps embodied in the present invention. Those components include microprocessor, memory and voice chip elements, as well as an analog/digital converter for converting an analog signal output from the sensor to a digital format.

Also affixed to main PCB 50 is a display element 60 such as liquid crystal display (LCD) arranged to be large enough so that the displayed characters are easy to read. The display may incorporate a backlighting feature, for night readings. Centrally affixed to this PCB 50 is an activation switch 70 comprised of a compliant material, such as rubber. Electrically connected to the main PCB and positioned in a lower region of the housing is a speaker 80, for producing digitized speech sounds.

The above-described elements are positioned such that the face of the LCD display 60 corresponds with a window 90 in the front surface of the housing 20, as best illustrated in FIG. 3. The window has a pane comprising, for example, a sheet of acrylic 95 or other such transparent or partially transparent material. This sheet 95 also extends on the front surface of the housing 20 and includes a depressible activation area 100. The activation area 100 is defined, for example, by a line of weakness or a partially cut out portion of the front housing surface, such that pressure by a user on the activation area 100 slightly and resiliently lowers (i.e. depresses) this area. This lowering applies pressure to and operates the aforementioned activation switch 70 within the housing.

A multiply apertured region 110 in the housing front surface is arranged to cover the face of the speaker element 80, so that the housing 20 serves as an effective speaker enclosure for producing speech sounds. In a back surface area of the housing (not shown), the device incorporates a power source, such as a long life, lithium coin cell battery. Such power source may also include any conventionally known arrangement for powering the device. A bottom area of the device is formed as a hook 120 or other standard hanging means known in the industry, for conveniently carrying the lightweight device on an individual's person or for storing the device.

Figure 4:
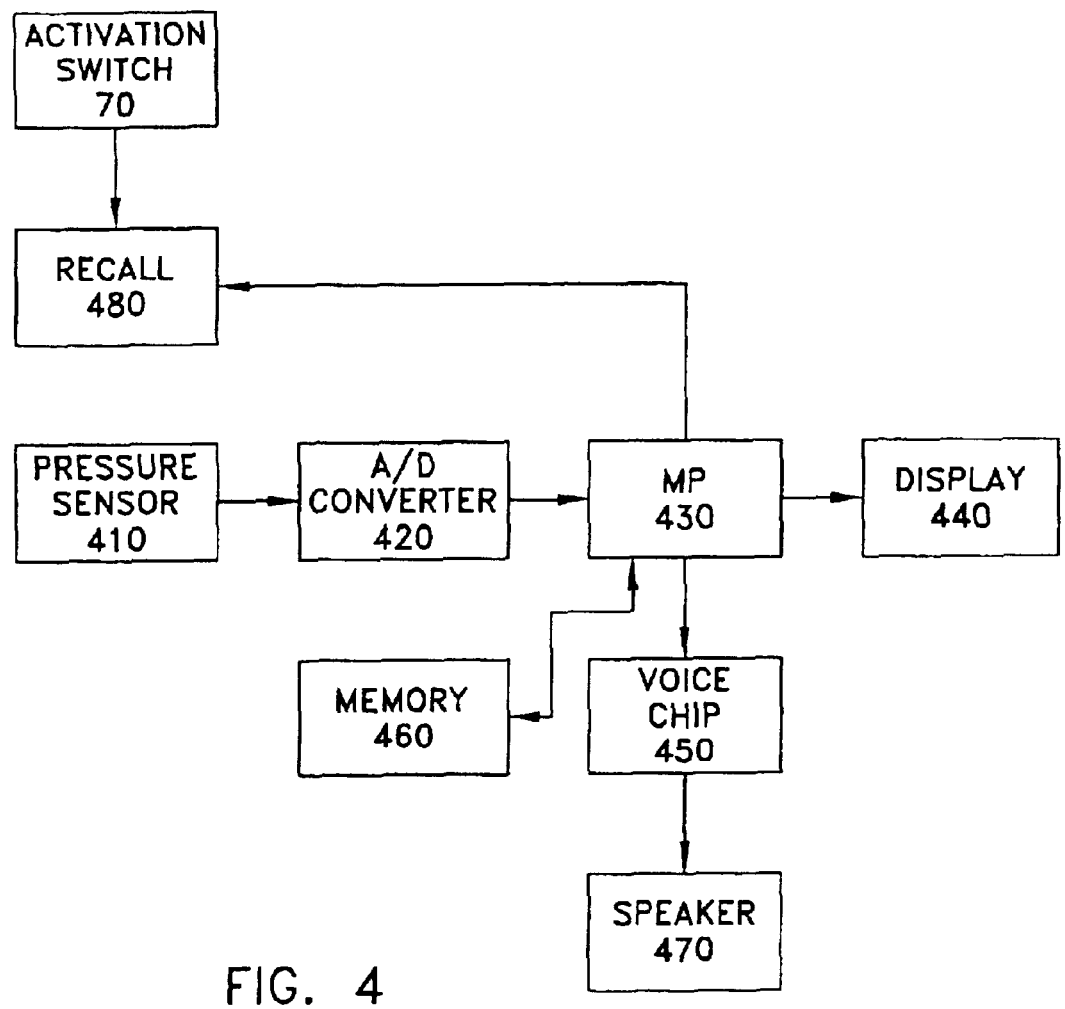
FIG. 4 is a block diagram illustrating the functional components and operation of the device shown in FIG. 1.

As illustrated in the block diagram of FIG. 4, in operation the user applies the port 30 to a valve of an object having a pressure desired to be measured. Such object may be a tire, such as a vehicle or bicycle tire, or other pressurized object such as an inflated sports ball. A small amount of pressurized air from the object enters the port 30 and causes the associated pressure sensor 410 to transmit an output signal representing a pressure reading for the object. This signal is sent to the analog/digital converter 420 for converting the signal to a digital format. The resulting digital signal is then sent to the microprocessor 430, which is configured to transmit the signal to both the display 440 and voice chip 450 elements, as well as to the memory 460 element for storage of this pressure reading. Note that the memory may include one or more of cache, RAM, DRAM, and other volatile or non-volatile memories for storing information. Note further that the voice chip or voice processor may The voice chip element converts the signal to a signal representing an appropriate voice message, which is then sent to the speaker 470 for producing a voice communication regarding the pressure reading quantity. Thus, upon taking a pressure reading, the device produces simultaneously both a visual and an audio conveyance of the reading to the user. As an example, if the user applies the gauge to a tire having a pressure of 30 psi, the display will show that reading and the device will, at substantially the same time, produce an audible voice message of "30 psi".

If the user desires to see or hear that reading at a later time, after the pressure reading has been taken and the gauge is no longer in communication with the object to be measured, the user may press the activation area 100 associated with the activation switch 70. The switch 70 activates the recall function 480 and signals the microprocessor 430 to retrieve the stored measurement data from the memory 460 and sends that information again to both the display 440 and the voice chip 470. Thus, the user can repeatedly be informed of the "last value" measured pressure quantity, by both visual and audio means, at any convenient time after taking the pressure reading.

It is anticipated by the invention that other sensory communication means may also be used for the device. As an example, in the place of the visual or audio means, the device may also be configured to vibrate when the measurement reaches or exceeds a certain pressure quantity. Such vibration mechanisms may be similar to those used in pagers. These other communication means that can be associated with a recall mechanism are intended to be covered by the invention.

The above-described slim design of the present invention provides a highly convenient and ergonomic device. The device is lightweight and fits easily in the user's hand. Its easy to grip configuration allows the user to easily and accurately apply the gauge onto a measurement point and and use a thumb or finger to optimally position the port. Then, while maintaining that position, the user may read or hear the pressure reading and quickly press the recall button to be re-informed of that reading. If the measurement point is in a hard to view location or if the reading is done at night, as an example, the audio read-out still effectively informs the user of the pressure quantity.

Such audio read-outs allow for quick and convenient readings even if the user must apply the gauge at an awkward angle or in a hard to view position. Even if this initial measurement is not immediately heard or seen by the user, pressing the recall button easily re-conveys that information. Thus, the data may be recalled immediately or even much later for various purposes, thereby eliminating any need to take repeated measurements.

Additionally, the gauge has the advantage of producing highly accurate readings typical of such digital pressure gauges, which also improves its ease of use. Its durable design and use of a long life power source allows it to be used in various rugged environments or stored for a long period of time without losing the memorized data. Thus, the present novel device enables the convenient reading and retention of the "last value" measurements, which improves the taking of pressure readings in a wide variety of situations.

According to another aspect of the invention, the device may be configured to store and recall multiple readings on command. This feature may be especially useful when measuring multiple tires or multiple vehicles in one session. As an example, the device may be programmed to include an icon for "left front tire", "right rear tire" and so on, so that the user can easily access the various corresponding measurements. This may be accomplished, for example, via a touchpad or keypad panel positioned on the outer surface of the housing and in electrical communication with appropriate circuitry contained within the interior of the device, so as to enable the storage and subsequent retrieval of multiple pressure readings.

The foregoing description of the embodiments of this invention has been presented for purposes of illustration and description. It is not intended to be exhaustive or to limit the embodiments of the invention to the form disclosed, and, obviously, many modifications and variations are possible. As an example, the device's sleek design may be modified and the accompanying processing steps, electronic components or circuitry may also be changed.

As a further example, while the activation button speaker and display are positioned on the top outer surface of the device housing, such components may be positioned elsewhere on the device. Still further, the recall mechanism stimulus may be, instead of a user-depressible area, a voice activatable sensor such that upon sensing a speech pattern such as "again" or "recall," the microprocessor is activated to retrieve the appropriate value from memory (including, for example, cache memory) and providing it to the user for visual and/or audible display. These and such other modifications and variations that may be apparent to a person skilled in the art are intended to be included within the scope of this invention.

What is claimed is:

1. A pressure gauge comprising:
    a housing having an inlet port for receiving fluid pressure of an object to be measured;
    a sensor in communication with said inlet port for providing a value of said fluid pressure present at said inlet port;
    a memory for storing said value; and
    an actuator capable in response to actuation in a first mode for providing an audible output indicative of a pressure value stored in said memory prior to said actuation.

2. The pressure gauge of claim 1, wherein, the actuator is activatable for providing said audible input indicative of the stored pressure value independent of the time the value was stored in memory.

3. The pressure gauge of claim 1, wherein the actuator comprises a processor responsive to an activatable switch for providing said audible output.

4. The pressure gauge of claim 3, wherein the processor comprises a voice processor responsive to a microprocessor controller.

5. The pressure gauge of claim 3, wherein the processor comprises a look up table containing a mapping of pressure values to parameters indicative of audible utterances corresponding to said pressure values.

6. The pressure gauge of claim 3, wherein the activatable switch comprises a depressible area formed on the surface of said housing.

7. The pressure gauge of claim 3, wherein the activatable switch comprises a single depressible input.

8. The pressure gauge of claim 1, wherein, said memory is capable of storing multiple pressure values indicative of multiple pressure measurements, and wherein said actuator includes means for selectively accessing corresponding ones of said stored measurements.

9. The pressure gauge of claim 8, wherein the means for selectively accessing comprises an input panel on said housing for enabling user input selection.

10. A handheld tire pressure gauge comprising:
    a housing conforming to the hand of a user;
    an inlet port formed on said housing for connecting to an object to receive air pressure of the object for measurement;
    a sensor contained within said housing and in communication with said inlet port for determining the air pressure value associated with said object;
    a memory for storing said value;
    a user activatable area on said housing for generating a signal to a processor to retrieve said stored value from memory, said processor operable for providing an audible output indicative of said retrieved value.

11. The pressure gauge of claim 10, wherein said processor includes a microprocessor for generating a signal to a voice processor to generate said audible output.

12. The pressure gauge of claim 11, further comprising an analog to digital converter responsive to said sensor for providing a digital representation of said measured pressure to said microprocessor.

13. The pressure gauge of claim 10, further comprising a display formed on said housing for providing a visual display of said measured air pressure.

14. The pressure gauge of claim 10, wherein said user activatable area includes a user selection panel for selectively enabling retrieval of selected ones of a plurality of measured air pressure values stored in said memory.

15. The pressure gauge of claim 10, wherein the processor comprises a look up table containing a mapping of pressure values to parameters indicative of audible utterances corresponding to said pressure values.

16. The pressure gauge of claim 1, wherein the user activatable area includes a voice activatable sensor for causing said processor to retrieve said stored value from memory.

17. A hand-held pressure gauge comprising:
    a housing conforming to the hand of a user;
    an inlet port at a first end of said housing for connecting to an object to receive air pressure of the object for measurement;
    a sensor contained within said housing and in communication with said inlet port for determining the air pressure value associated with said object;
    means responsive to said sensor for storing a parameter indicative of said measured value in memory and for providing both a visual display and audible utterance of said measured value to a user upon connection with said object;
    means formed on said housing and responsive to subsequent user activation for recalling from said memory said last stored value and for outputting said audible utterance of said measured value.

* * * * *